United States Patent
Smith

(10) Patent No.: US 11,546,304 B2
(45) Date of Patent: Jan. 3, 2023

(54) MULTI-DOMAIN MESSAGE ROUTING WITH E2E TUNNEL PROTECTION

(71) Applicant: Intel Corporation, Santa Clara, CA (US)

(72) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 16/649,076

(22) PCT Filed: Sep. 28, 2018

(86) PCT No.: PCT/US2018/053420
§ 371 (c)(1),
(2) Date: Mar. 19, 2020

(87) PCT Pub. No.: WO2019/094119
PCT Pub. Date: May 16, 2019

(65) Prior Publication Data
US 2020/0274849 A1    Aug. 27, 2020

Related U.S. Application Data

(60) Provisional application No. 62/585,389, filed on Nov. 13, 2017.

(51) Int. Cl.
*H04L 9/40*    (2022.01)
*H04W 12/02*   (2009.01)

(52) U.S. Cl.
CPC ........ *H04L 63/029* (2013.01); *H04L 63/0281* (2013.01); *H04L 63/0428* (2013.01); *H04W 12/02* (2013.01)

(58) Field of Classification Search
CPC ............... H04L 63/029; H04L 63/0281; H04L 63/0428; H04W 12/02
(Continued)

(56) References Cited

U.S. PATENT DOCUMENTS 7,904,714 B2 *   3/2011   Lee ................. H04L 9/0637
                                                       380/240
8,346,949 B2 *   1/2013   Vaarala ............ H04L 63/123
                                                       709/229
(Continued)

FOREIGN PATENT DOCUMENTS

WO   WO-2019094119 A1   5/2019

OTHER PUBLICATIONS

Selander, J Mattsson, et al., "Object Security for Constrained RESTful Environments (OSCORE); draft-ietf-core-object-security-06.txt", Object Security for Constrained Restful Environments (OSCORE); DRAFT-IETF-CORE-OBJECT-SECURITY-06.TXT; Internet-Draft: Core Working Group, (Oct. 25, 2017), pp. 1-45.*

(Continued)

*Primary Examiner* — Dant B Shaifer Harriman
(74) *Attorney, Agent, or Firm* — Schwegman Lundberg & Woessner, P.A.

(57) ABSTRACT

Systems and techniques to enable message routing among multiple devices and device domains, via end-to-end tunneling techniques, are disclosed. In an example, techniques and device configurations involving the use of RESTful protocols that communicate OSCORE (Object Security for Constrained RESTful Environments) payloads over OSCORE tunnels, involve receiving an OSCORE message having an encrypted COSE (Concise Binary Object Representation (CBOR) Object Signing and Encryption) object payload and inserting the OSCORE message into an OSCORE tunnel message to implement a tunneled communication with a receiving device. Here, the tunnel message includes the OSCORE message within an envelope encrypted COSE object payload. The OSCORE tunnel message may then be transmitted to the receiving device. Further techniques and device configurations for the receipt, pro- (Continued)

cessing, conversion, and decryption of such tunneled messages are also disclosed.

21 Claims, 13 Drawing Sheets

(58) Field of Classification Search
USPC .................................................. 713/151
See application file for complete search history.

(56) References Cited

U.S. PATENT DOCUMENTS

| | | | | |
|---|---|---|---|---|
| 8,458,453 | B1* | 6/2013 | Mahalingaiah | H04L 63/0428 |
| | | | | 713/153 |
| 9,462,085 | B2* | 10/2016 | Bullotta | H04L 67/02 |
| 10,541,916 | B2* | 1/2020 | De | H04L 45/74 |
| 11,012,429 | B2* | 5/2021 | Dhanabalan | H04L 63/0478 |
| 2006/0173968 | A1* | 8/2006 | Vaarala | H04L 9/0841 |
| | | | | 709/227 |
| 2009/0034557 | A1 | 2/2009 | Fluhrer et al. | |
| 2010/0138560 | A1* | 6/2010 | Kivinen | H04L 61/2514 |
| | | | | 709/246 |
| 2014/0282957 | A1 | 9/2014 | Thakore et al. | |
| 2017/0093580 | A9* | 3/2017 | Vaarala | H04L 63/123 |

OTHER PUBLICATIONS

"International Application Serial No. PCT/US2018/053420, International Search Report dated Dec. 7, 2018", 5 pgs.

"International Application Serial No. PCT/US2018/053420, Written Opinion dated Dec. 7, 2018", 6 pgs.

Selander, J Mattsson, et al., "Object Security for Constrained RESTful Environments (OSCORE); draft-ietf-core-object-security-06.txt", Object Security for Constrained Restful Environments (OSCORE); DRAFT-IETF-CORE-OBJECT-SECURITY-06.TXT; Internet-Draft: Core Working Group, Internet Engineering Task Force, IETF; Standardworkingdraft, (Oct. 25, 2017), 1-45.

"International Application Serial No. PCT US2018 053420, International Preliminary Report on Patentability dated May 28, 2020", 8 pgs.

* cited by examiner

MULTI-DOMAIN MESSAGE ROUTING WITH E2E TUNNEL PROTECTION

PRIORITY CLAIM

This application is a U.S. National Stage Filing under 35 U.S.C. 371 from International Application No. PCT/US2018/053420, filed Sep. 28, 2018 and published in English as WO 2019/094119 on May 16, 2019, which claims the benefit of priority to U.S. Provisional Patent Application Ser. No. 62/585,389, filed Nov. 13, 2017 and titled "MULTI-DOMAIN MESSAGE ROUTING WITH E2E TUNNEL PROTECTION", each of which is incorporated herein by reference in its entirety.

TECHNICAL FIELD

Embodiments described herein generally relate to data communications and interconnected device networks and, in particular, to techniques for securing message communications among multiple entities and domains of device networks.

BACKGROUND

Internet-of-Things (IoT) devices are physical or virtualized objects that may communicate on a network, and may include sensors, actuators, and other input/output components, such as to collect data or perform actions from a real world environment. For example. IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated. Further, such IoT devices include many types of computing devices, including those operable in non-internet settings, including in FOG, Multi-Access Edge Computing (MEC), Edge Cloud, 5G, and Cloud Computing environments.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
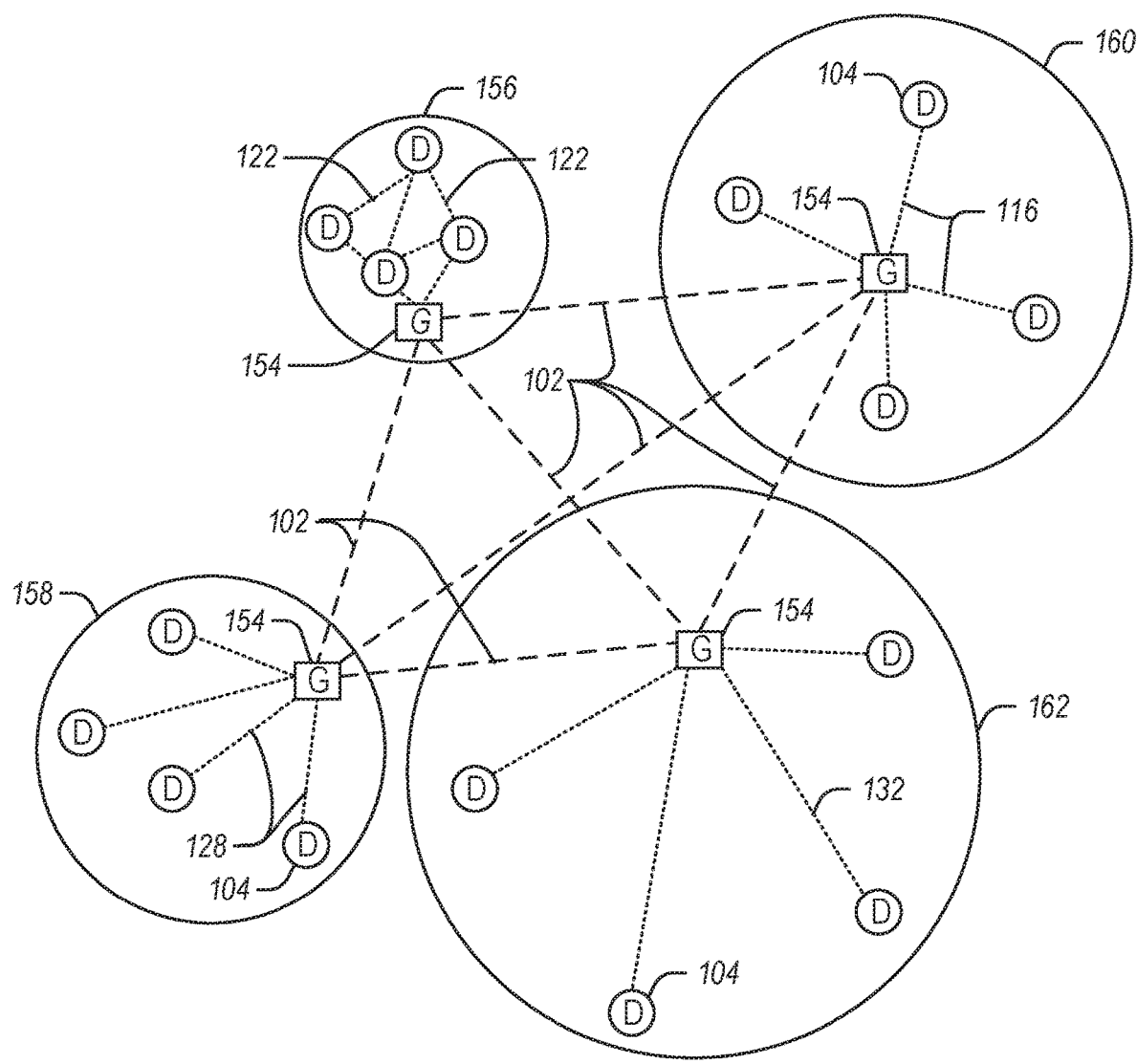
FIG. 1 illustrates a domain topology for respective internet-of-things (IoT) networks coupled through links to respective gateways, according to an example.

In the following description, methods, configurations, and related apparatuses are disclosed for multi-domain message routing with end-to-end (E2E) tunnel protection. IoT message exchange through Internet networks (e.g., the cloud) may involve multiple Representational State Transfer (RESTful) protocols such as Constrained Application Protocol (CoAP) over Universal Datagram Protocol (UDP) or Hypertext Transfer Protocol (HTTP) over Transmission Control Protocol (TCP) or Generic Attributes (GATT) over Bluetooth Low Energy (BLE). RESTful protocol header translation occurs as a message traverses one network to another. However, message payloads may become exposed if the message protection method is symmetrical to the message delivery protocol. For example, CoAP may use CoAPS and HTTP may use HTTPS.

To address security concerns in RESTful environments, Object Security for Constrained RESTful Environments (OSCORE) is an IETF proposal that has been proposed to enable message payloads to be encrypted end-end. When implemented, OSCORE allows protocol translations to occur without exposing cleartext payloads. However, there is a problem with OSCORE and other secure message delivery protocols because intermediate (e.g., hop-by-hop) message routers are able to perform traffic analysis over the message headers. Message headers contain metadata that is very useful toward building connection graphs that may further be used with inferencing technology to reveal more information about the actual endpoints than was anticipated.

Attempts to address this problem have been made with Onion Router (TOR) networks, Transport Layer Security (TLS) tunneling (e.g., 892.1X EAP such at EAP-TTLS—as well as tunneling over HTTPS, for all of HTTP, HTTPS, and CoAPs—and Extensible Application Protocol (EAP) techniques. TOR obfuscates original endpoints of message exchanges. These technologies have their own problems. For example, TOR operates only on IP networks. If an IoT message originates or terminates on a non-IP network, such as a Bluetooth Low Energy (BLE) network, then the resistance to traffic analysis is lost. In another example, EAP techniques only apply to the network-edge (layer 2), which protects only the air-gap between device and access point. Further, tunneling TLS over TLS has the disadvantage that TLS and DTLS both assume multiple message exchanges may occur in order to negotiate key exchange protocols. This is in addition to message fragmentation and reassembly, where the TLS frames are part of the cryptographic protections. These exchanges present a significant challenge if messaging environments are store-and-forward or involve multi-hop RESTful exchanges.

To address the security issues noted above. RESTful protocols containing OSCORE payloads are tunneled over OSCORE to prevent untrusted intermediary nodes from applying traffic analysis attacks on the headers (and data if the node happens also be a TLS endpoint). To accomplish this, trusted intermediaries are made accessible (e.g., directly or virtually) and may span one or more untrusted intermediaries. Thus, a trusted HOP-by-HOP message route may be defined on top of a logical hop-by-hop message route.

The advantage of an OSCORE tunnel versus OSCORE, by itself, is found in the end-to-end protection of the payload message. Further, the message routing headers are encapsulated as part of the tunnel payload to mitigate traffic analysis attacks by intermediaries. Along with these security benefits, RESTful routing techniques may remain simple, based on locating the nearest neighbor. Further, these techniques do not have to encumber the route policy with trust domain metadata or require attestation of routing nodes to establish their trustworthiness. Thus, routers need to do no more than simply route traffic.

Although the techniques and configurations discussed herein are provided with reference to "IoT" processing devices and networks, it will be understood that these techniques and configurations are operable in many alternative contexts. Indeed, translation from COAP to HTTP may be used to cross network contexts (e.g. cloud=HTTP). Similarly, there may be a 5G protocol that acts as a tunnel/proxy for an OSCORE payload. Accordingly, because OSCORE is not message transport layer specific, the present techniques and configurations may be carried by 5G or another protocol not traditionally associated with "the Internet".

FIG. 1 illustrates an example domain topology for respective IoT networks coupled through links to respective gateways. The IoT supports deployments in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, enabling larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
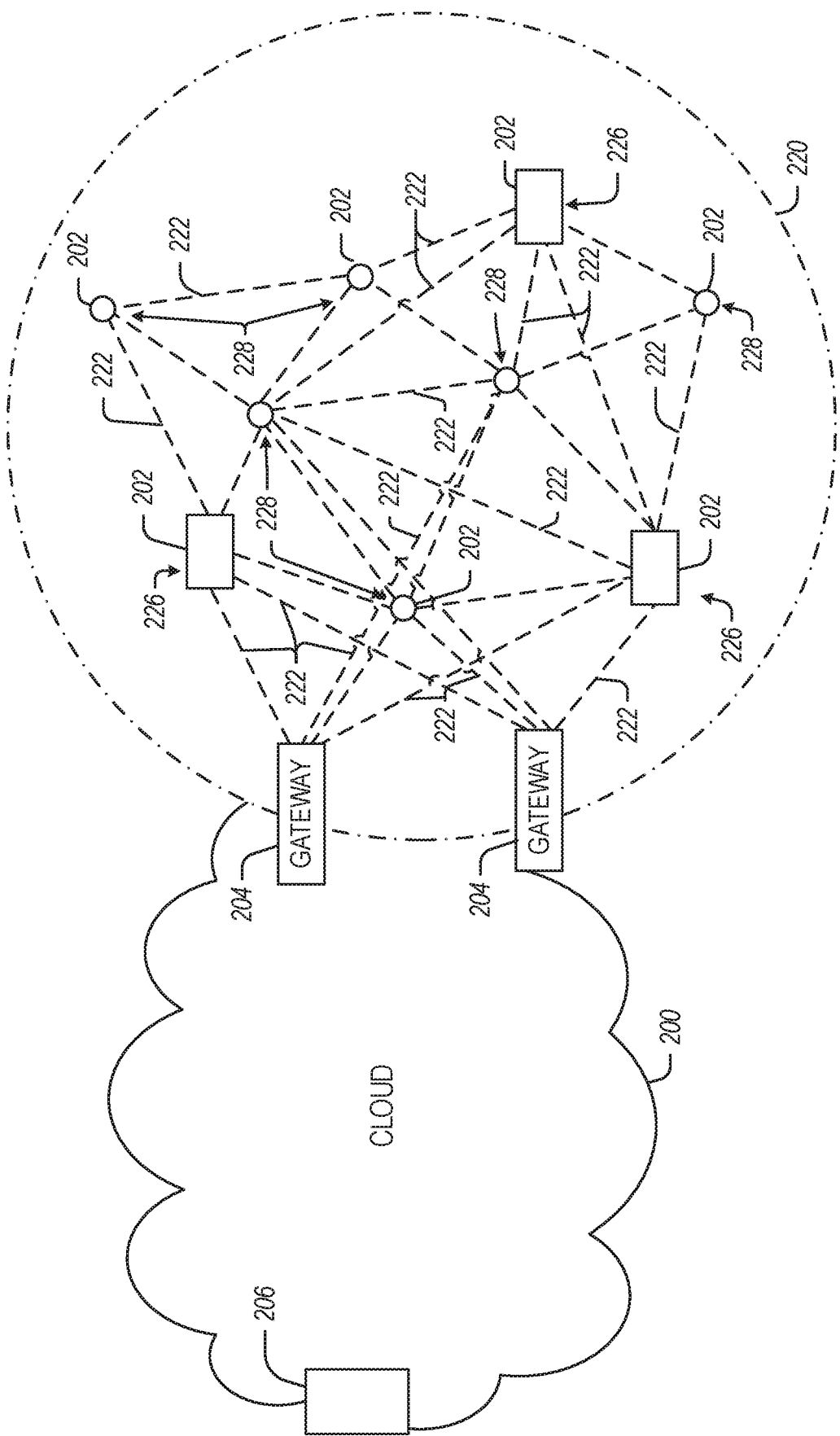
FIG. 2 illustrates a cloud-computing network in communication with a mesh network of IoT devices operating as a fog device at the edge of the cloud-computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements, and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of IoT networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, or vibration into the autonomous organizations among the IoT devices. The integration of sensory systems may enable systematic and autonomous communication and coordination of service delivery against contractual service objectives, orchestration and QoS-based swarming and fusion of resources. Individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 12 and 13.

In still further examples, aspects of network virtualization and virtualized/software-based functional management, including software defined networking (SDN), may be implemented with the networks 158, 160, 162, or other entities. For instance, SDN may provide a software-based programmable network that separates the control plane from the data plane to make the network and network functions more flexible, agile, scalable, and less dependent on networking equipment, vendors, and service providers. Other use cases of SDN features may involve dynamic network configurations, monitoring, and the abstraction of network functions in virtualized and dynamic systems, for redundancy, control, and improved performance.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 2 below.

FIG. 2 illustrates a cloud computing network in communication with a mesh network of IoT devices (devices 202) operating as a fog platform in a networked scenario. The mesh network of IoT devices may be termed a fog network 220, established from a network of devices operating at the edge of the cloud 200. To simplify the diagram, not every IoT device 202 is labeled.

The fog network 220 may be considered to be a massively interconnected network wherein a number of IoT devices 202 are in communications with each other, for example, by radio links 222. The fog network 220 may establish a horizontal, physical, or virtual resource platform that may be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 220 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog network 220 and may also provide the backend process function for data obtained from sensors 228, such as motion data, flow data, temperature data, and the like. The data aggregators 226 may collect data from any number of the sensors 228 and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and enabling the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, enabling communications to be maintained, even with the loss of a number of IoT devices 202. Further, the use of a mesh network may enable IoT devices 202 that are very low power or located at a distance from infrastructure to be used, as the range to connect to another IoT device 202 may be much less than the range to connect to the gateways 204.

The fog network 220 provided from these IoT devices 202 may be presented to devices in the cloud 200, such as a server 206, as a single device located at the edge of the cloud 200, e.g., a fog network operating as a device or platform. In this example, the alerts coming from the fog platform may be sent without being identified as coming from a specific IoT device 202 within the fog network 220. In this fashion, the fog network 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog network 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog network 220 device to the server 206 to answer the query. In this example, IoT devices 202 in the fog network 220 may select the sensors 228 used based on the query, such as adding data from flow sensors or temperature sensors. Further, if some of the IoT devices 202 are not operational other IoT devices 202 in the fog network 220 may provide analogous data, if available.

Figure 3:
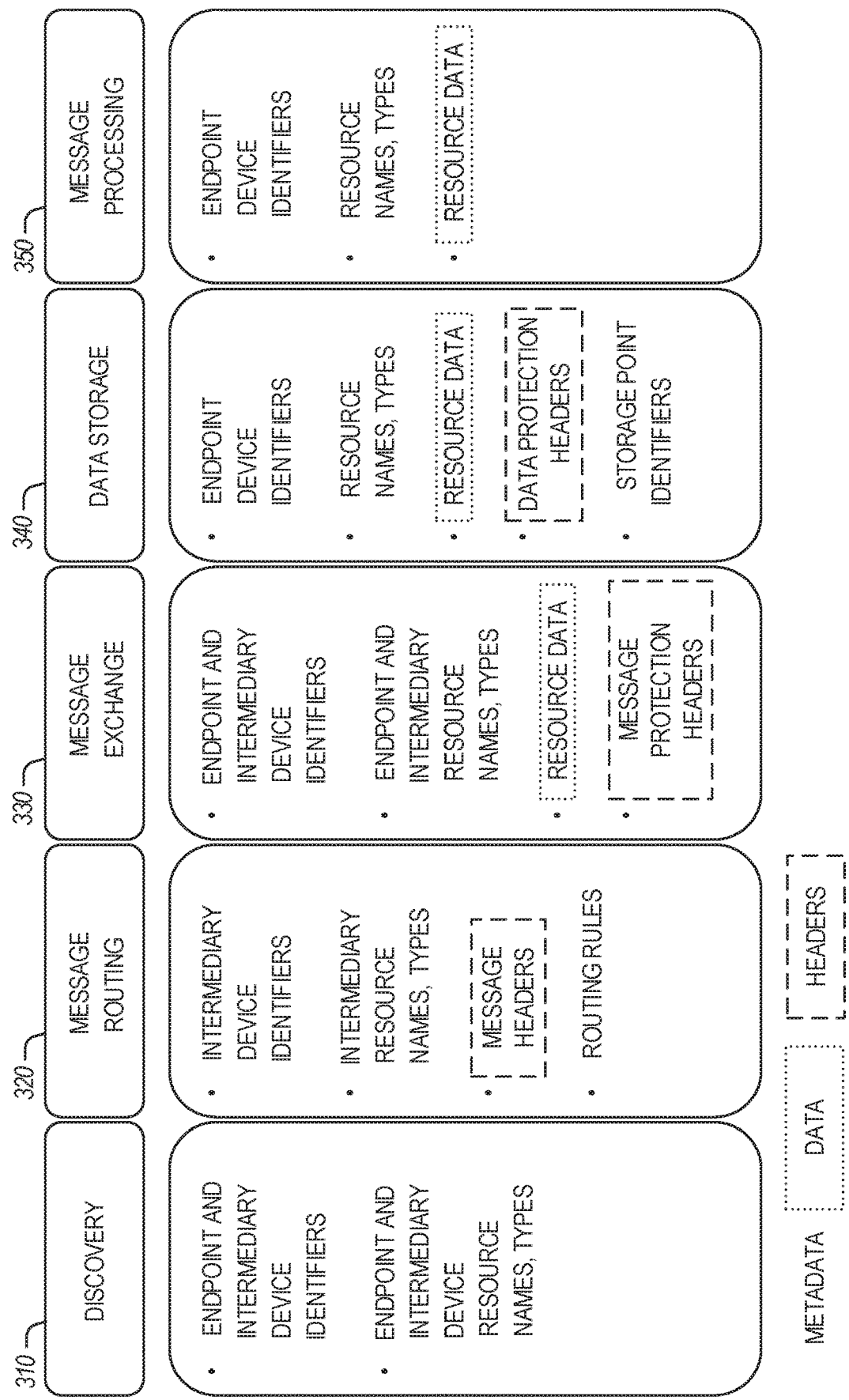
FIG. 3 illustrates functional areas operating in a cloud architecture, according to an example.

FIG. 3 illustrates a set of functional areas operating in an example cloud architecture. The illustrated functional areas, discovery 310, message routing 320, message exchange 330, data storage 340, and message processing 350, each have a security impact. In an example, the security impact areas of these functional areas involve: E2E protection; crossing trust boundaries, privacy preservation; and service protection. Accordingly, in the functional areas 310-350, various forms of assets-metadata, data, and headers—are at possible risk for such security impacts. These assets are identified in FIG. 3 in each of the functional areas according to the key at the bottom of the figure.

Figure 4:
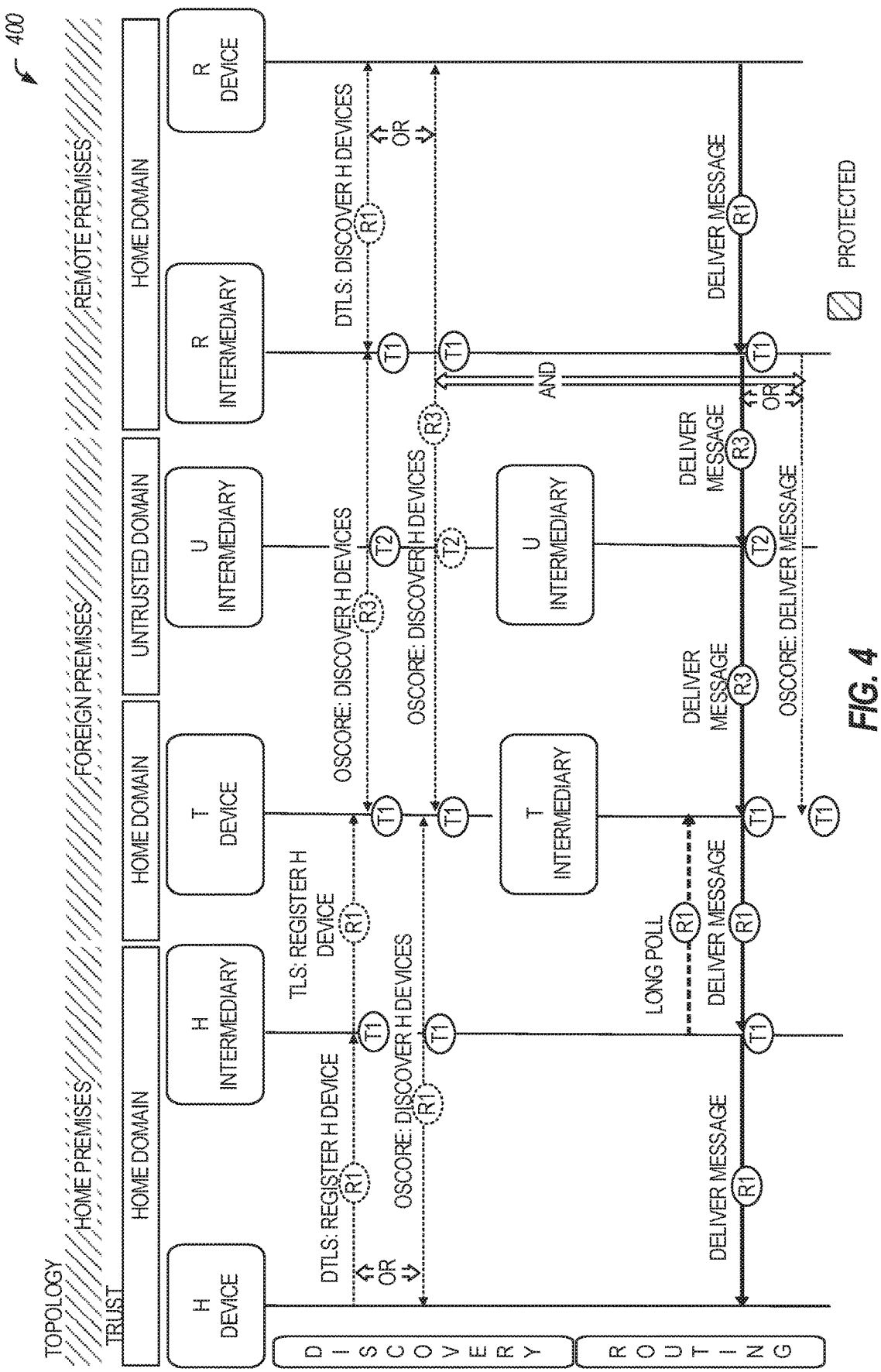
FIG. 4 illustrates remote intra-domain discovery using Object Security for Constrained RESTful Environments (OSCORE) messaging, according to an example.
Figure 5:
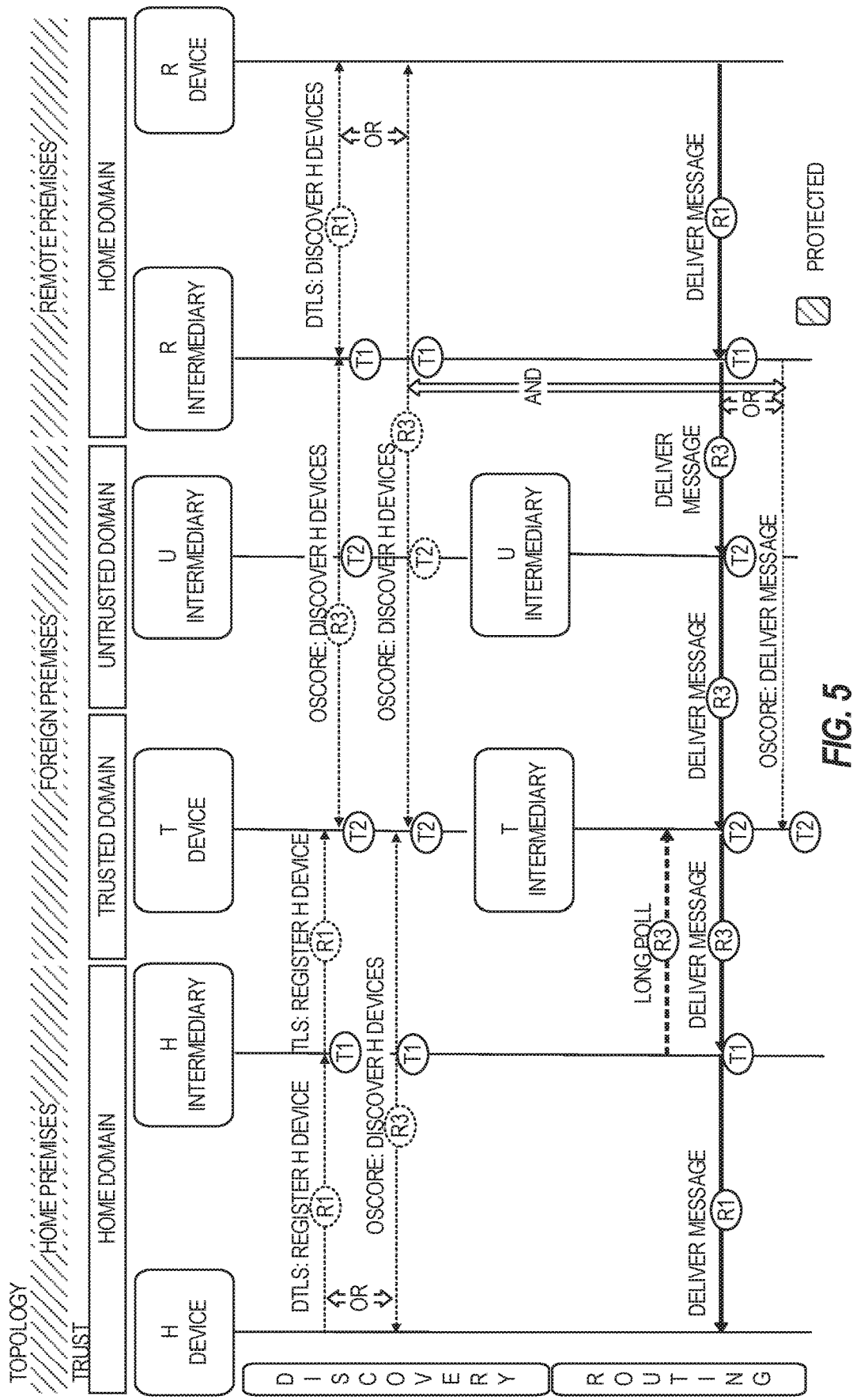
FIG. 5 illustrates remote inter-domain discovery using OSCORE messaging, according to an example.
Figure 6:
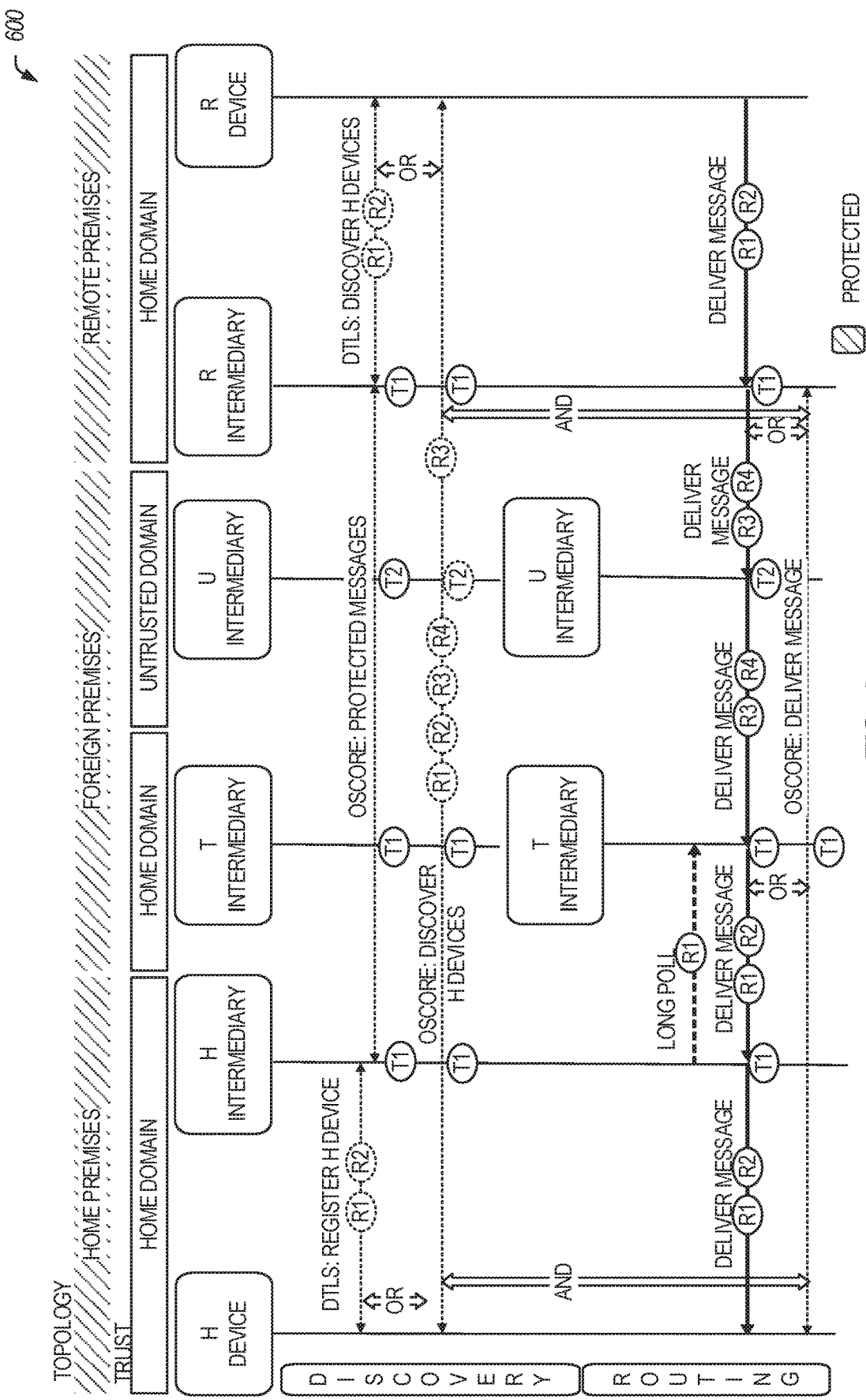
FIG. 6 illustrates a remote intra-domain data exchange using OSCORE messaging, according to an example.

Based on these functional areas, and the tunneling approaches discussed herein, the following messaging scenarios are depicted: FIG. 4 illustrates messaging for an example remote intra-domain discovery scenario; FIG. 5 illustrates messaging for an example remote inter-domain discovery scenario; and FIG. 6 illustrates messaging for an example remote intra-domain data exchange scenario. FIGS. 4-6 use the following abbreviations for possible risk categories among the various transactions:

T1: intra-domain traffic analysis
T2: inter-domain traffic analysis
R0: no interaction
R1: intra-domain metadata
R2: intra-domain data interaction
R3: inter-domain metadata
R4: inter-domain data interaction.

Further, when these abbreviations are surrounded by a short-dashed oval they are "mitigated" and are "unmitigated" otherwise (illustrated with a solid line).

FIGS. 4-6 also include use of the following terms:
Premises: topological locations where data, metadata, or protocol header information is processed.
Remote premises: a non-local premises (e.g., often associated with a home domain).
Foreign premises: a non-local premises (e.g., associated with something that is not a home domain).
Domain: root of authority for managing ownership, membership, delegation, or trust.
Home Domain: one or more premises with a common root of authority.
Trusted Domain: a vetted multi-home domain that performs functions on behalf of multiple domains.
Untrusted Domain: an un-vetted domain that performs domain functions on behalf of a home or trusted domain.
Endpoint or Device: endpoint where processing occurs (e.g., at an OCF application layer).
Intermediary: function where processing occurs within a framework layer (e.g., OCF framework layer) and not at an application layer.

FIG. 4 illustrates an example scenario of remote intra-domain discovery using OSCORE messaging, where various trust domains are illustrated relative to network topology extending among home premises, foreign premises, and remote premises. In the diagram 400, the "T" Device is a trusted device in a Home Domain because the T Device may not facilitate discovery of other devices that are not in Home Domain. Further, T is trusted for discovery of only "H" devices and intermediaries, whereas intermediary "U" device is untrusted for discovery. Thus, all "T" intermediaries are trusted to route messages to a next hop intermediary, while the "U" intermediary is not trusted to route messages to a next hop intermediary.

FIG. 5 illustrates an example scenario of remote inter-domain discovery using OSCORE messaging. In the diagram 500, the trusted "T" Device is in a Trusted Domain (rather than a Home Domain) because the T Device may facilitate discovery of other devices that are not in Home Domain. Further, the T Device is trusted for discovery of the home "H" device and other T Devices and Intermediaries, whereas the "U" intermediary is not trusted for data, metadata, or headers. Additionally, the T intermediary is trusted to route messages to a next hop intermediary, whereas the U intermediary is not trusted to route messages to a next hop intermediary.

FIG. 6 illustrates an example scenario of a remote intra-domain data exchange using OSCORE messaging. In the diagram 600, the "T" Device is in a Home Domain because the T Device may not facilitate discovery of other devices that are not in Home Domain. In this example, the T intermediary is not trusted for home domain data, but the T intermediary is trusted to route messages to a next hop intermediary. Further, the "U" intermediary is not trusted for data, metadata, or headers, and the U intermediary is not trusted to route messages to a next hop intermediary. However, the H and R Intermediaries may already share credentials from a priori security association.

Figure 7:
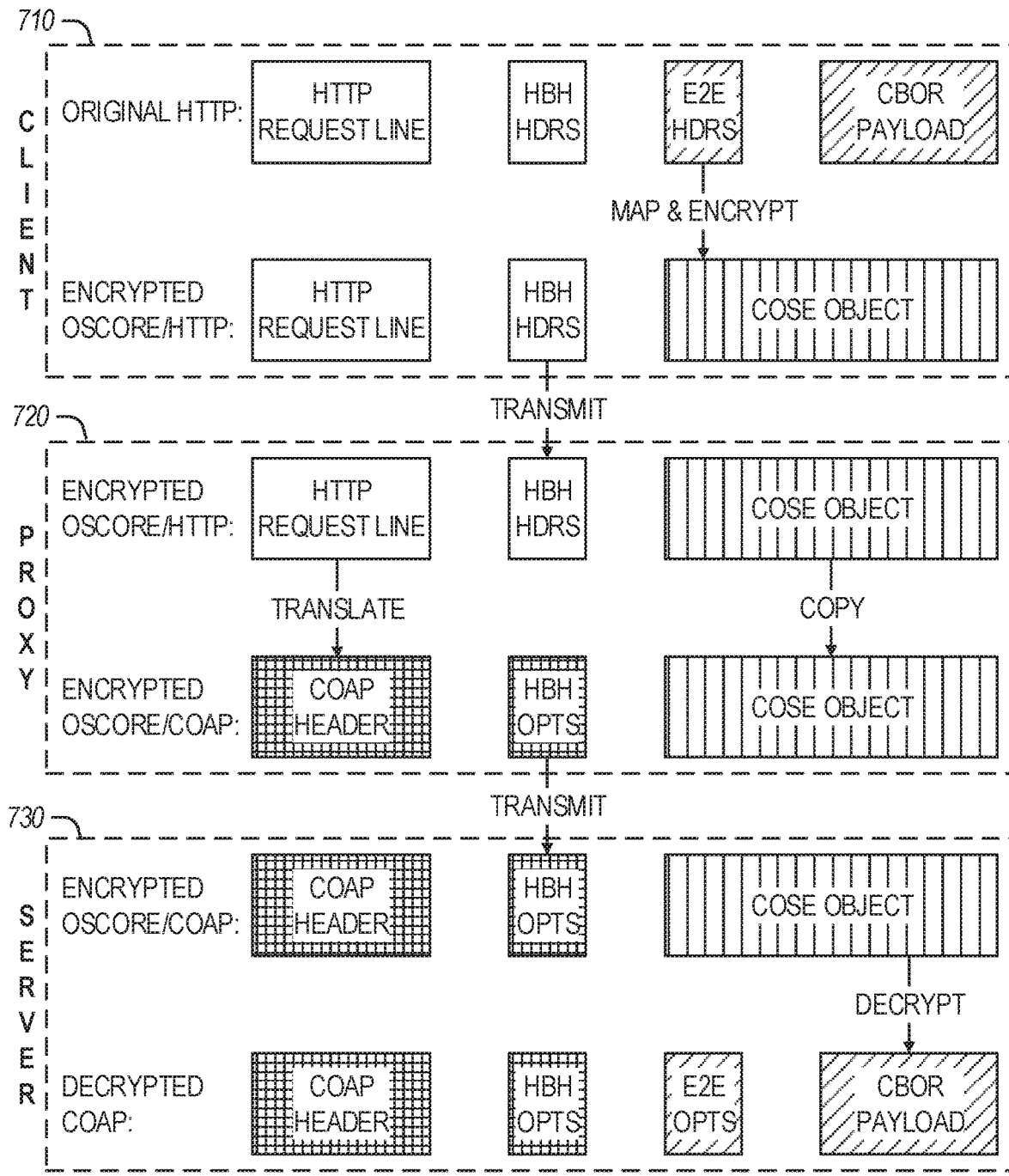
FIG. 7 illustrates HTTP to CoAP translation for a transaction using OSCORE, according to an example.

FIG. 7 illustrates HTTP to CoAP translation for an example transaction using OSCORE. This translation is performed from an HTTP message at the client 710 to a CoAP message at the server 730, as the transaction is communicated via data transmissions in an encrypted format using OSCORE. As shown, the data transmissions communicate the data from a client 710, to a proxy 720, to a server 730, using the OSCORE approach.

As depicted in FIG. 7, the client 710 operates to convert an original HTTP message into an encrypted OSCORE/HTTP message (e.g., map and encrypt), which is then transmitted to the proxy 720. The proxy 720 then operates to translate the encrypted OSCORE/HTTP message into an encrypted OSCORE/COAP message, which is then transmitted to the server 730. The server 730 operates to convert the encrypted OSCORE/COAP message into a decrypted CoAP message. Although the data payload may be encrypted at all points between the client 710 and the server 730, any intermediate hop devices (such as proxy 720) may be capable of identifying the hop-by-hop (HBH) headers or options associated with the encrypted OSCORE messages. In an example, HBH headers allow translation of between HTTP and COAP header formats without decryption. Additionally, a further objective of a proxy may be to perform data packet translation which would require decryption and therefore would operate as a trusted proxy (as opposed to an untrusted proxy).

Figure 8:
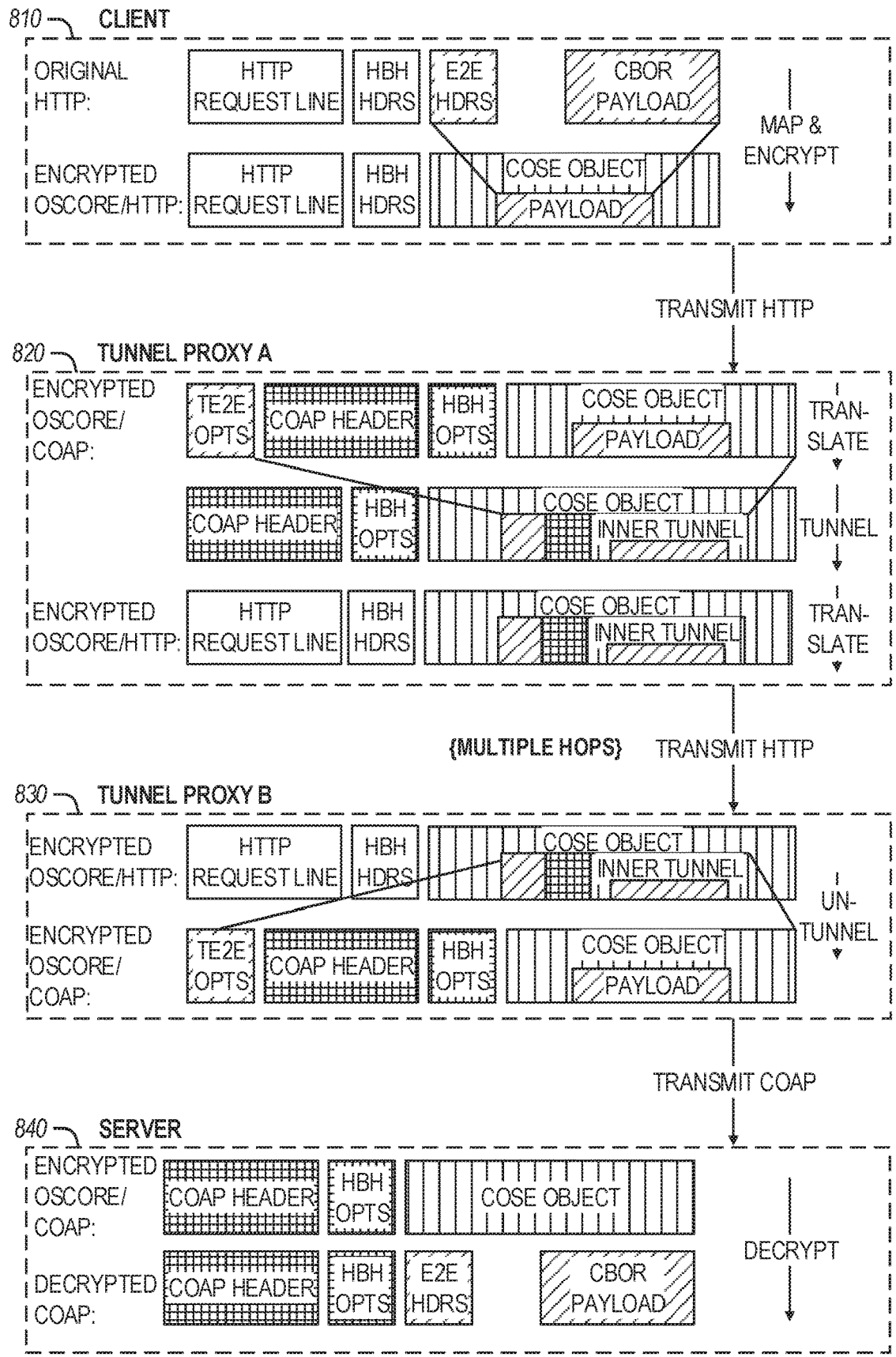
FIG. 8 illustrates HTTP to CoAP tunneling for a transaction using OSCORE, according to an example.

FIG. 8 illustrates HTTP to CoAP tunneling for an example transaction using OSCORE. The illustrated tunnel is an OSCORE tunnel for an OSCORE enabled HTTP to CoAP translation. As shown, a transmission is conveyed from a client 810, to a first tunnel proxy 820 (tunnel proxy A), then to a second tunnel proxy 830 (tunnel proxy B), and then to a server 840 using an OSCORE message communicated within an OSCORE tunnel message.

As shown, the client 810 operates to generate the encrypted OSCORE/HTTP message and provide this message to the first tunnel proxy 820. The first tunnel proxy 820 operates to translate the format of the encrypted OSCORE/HTTP message, establish a tunnel for the message, and then optionally change the format of the message (e.g., from OSCORE/COAP to OSCORE/HTTP or vice versa). This message is then communicated to the second tunnel proxy 830, with one or multiple hops (e.g., via untrusted devices).

The second tunnel proxy 830 operates to receive the encrypted tunneled message and extract the underlying OSCORE message from the COSE object (as depicted, an encrypted OSCORE/COAP message). This encrypted OSCORE message is then communicated to the end server, which performs decryption on the encrypted OSCORE message to produce a decrypted COAP message, and obtain the decrypted payload.

Figure 9:
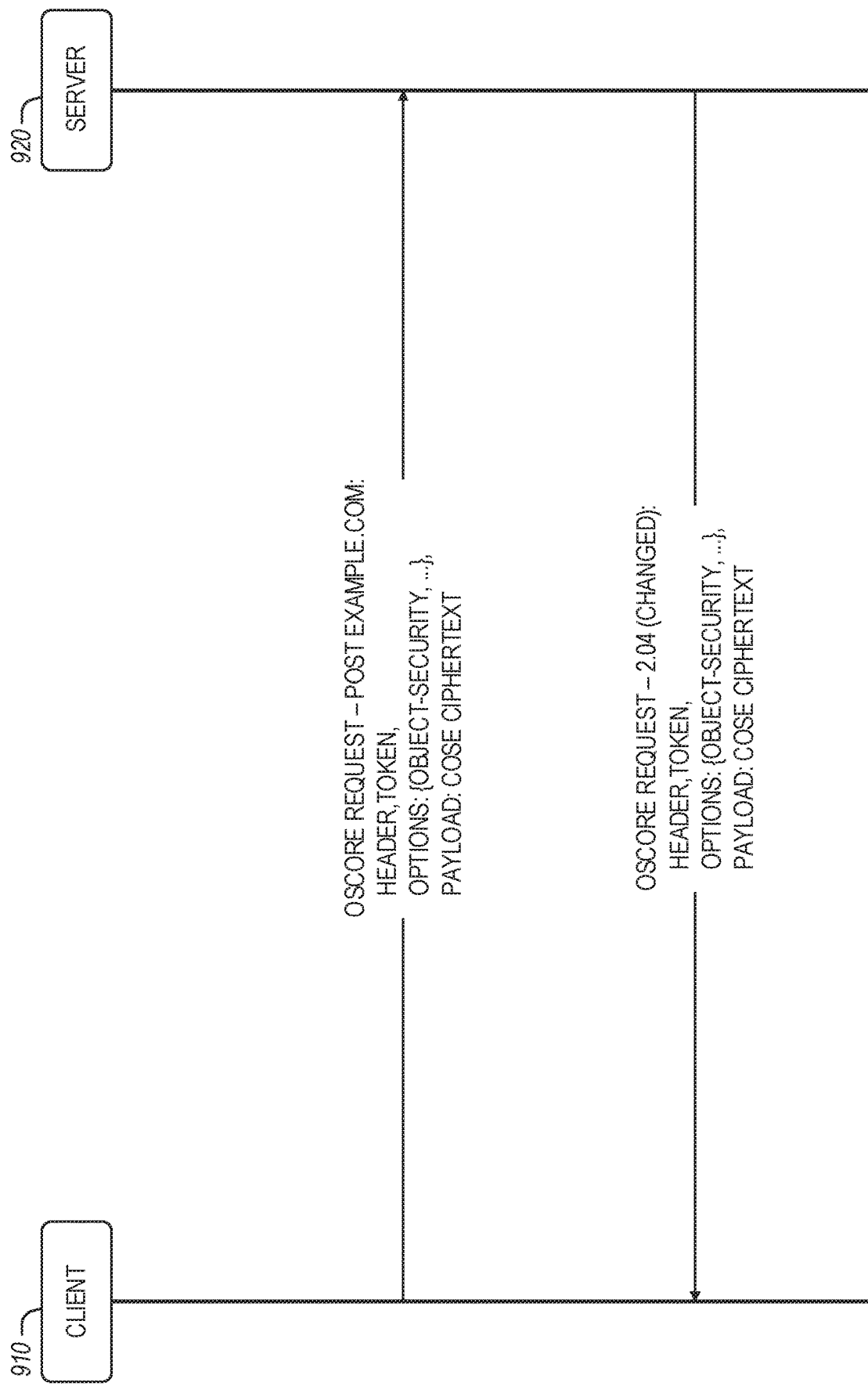
FIG. 9 illustrates CoAP with OSCORE messaging, according to an example.

FIG. 9 illustrates CoAP with OSCORE messaging for an example transaction. The messaging is featured in a JSON data format with RESTful messages (e.g., request and response) as transmitted between a client 910 and a server 920. Even with use of OSCORE translation and tunneling among intermediate devices, hops, and proxies (e.g., as depicted in FIGS. 7 and 8), the client 910 and server 920 are capable of exchanging encrypted communications via a known, standardized format such as JSON.

Figure 10:
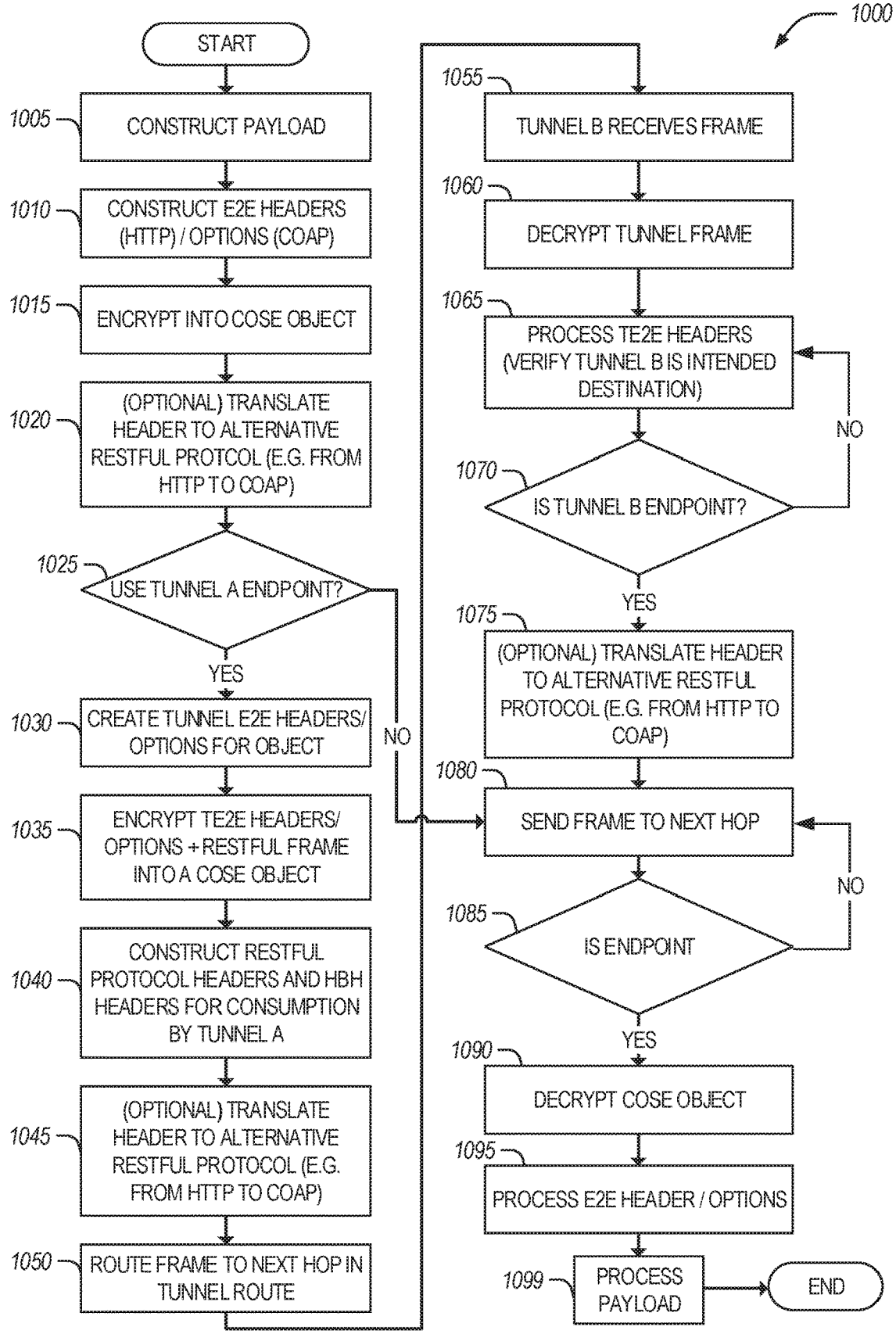
FIG. 10 illustrates a flowchart of a method for multi-domain message routing with end-to-end tunnel protection, according to an example.

FIG. 10 illustrates a flowchart 1000 of a method for multi-domain message routing with E2E tunnel protection, according to an example. The operations and decisions of the method of FIG. 10 are implemented in computer hardware, such as that described herein (e.g., circuitry). The operations of the flowchart 1000 may be performed by multiple devices or entities within a coordinated system, as described herein.

The flowchart 1000 begins with operations at 1005 to construct a payload for communication from a source device to a target device (e.g., from a client to a server, or vice-versa), and operations at 1010 to construct end-to-end message headers (e.g., using HTTP headers) and message options (e.g., using COAP messaging options). The payload and headers are then encrypted at 1015 into a COSE object. In an optional operation, at 1020, the message header(s) are also translated to an alternative RESTful protocol, such as from HTTP to COAP.

The flowchart 1000 continues with a determination at 1025 whether an endpoint of a first tunnel (Tunnel A) is used to communicate the encrypted object. If this endpoint is not used, then operations proceed at 1080 to send the frame to a next hop, as discussed below. If the endpoint is used, then operations proceed at 1030 to create tunnel end-to-end (TE2E) headers and options for the encrypted object, and at 1035 to encrypt the TE2E headers and message options and RESTful frame data into another COSE object. This is followed by an operation at 1040 to construct RESTful protocol headers and HBH headers for transmission via the first tunnel (Tunnel A). An optional operation may be performed at 1045 to translate the tunnel header to an alternative RESTful protocol (such as from HTTP to COAP). This is followed by an operation at 1050 to route the frame to the next hop in the tunnel route among untrusted entities (e.g., the communication of encrypted OSCORE data within an encrypted OSCORE tunnel).

The flowchart 1000 continues at 1055 with the receipt of the frame at the second tunnel (Tunnel B), and at 1060 with operations to decrypt the tunnel frame. The TE2E headers are processed at 1065, such as with use of operations to verify that the Tunnel B is the intended destination. A determination is performed at 1070 whether the Tunnel B entity is the endpoint for the message. If the Tunnel B is not the endpoint, then the operations may perform further routing at 1065. If the Tunnel B is the endpoint, then further processing is performed. Specifically, the flowchart 1000 continues at 1075 with optional operations to translate the header to an alternative RESTful protocol, such as from HTTP to COAP. This is followed by an operation at 1080 that sends the frame to the next hop. A determination is performed at 1085 based on whether the frame is the endpoint. If the frame is not the endpoint, then further routing may be performed at 1080. If the frame is the endpoint, then operations proceed at 1090 to decrypt the COSE object and process the E2E header with any applied options at 1095. As a result, a decrypted payload may be provided and processed at 1099.

In an OCF implementation, any endpoint node can implement a Proxy Device function as an embedded solution that, for example, connects a logical Proxy Device to a logical endpoint device as a way to encapsulate the payload transmission and proxy semantics. These logical devices may only be separated by threads of a same process (or by processes of a same operating system, or by enclaves of a same platform or by VMs of a same hypervisor, etc.). OCF defines "OCF Device" to align with this level of abstraction. Furthermore, an OCF Device may expose an internal (e.g. I/O) interface that connects to non-OCF Device abstraction components such as device drivers, daemons or other processes or peripherals.

Figure 11:
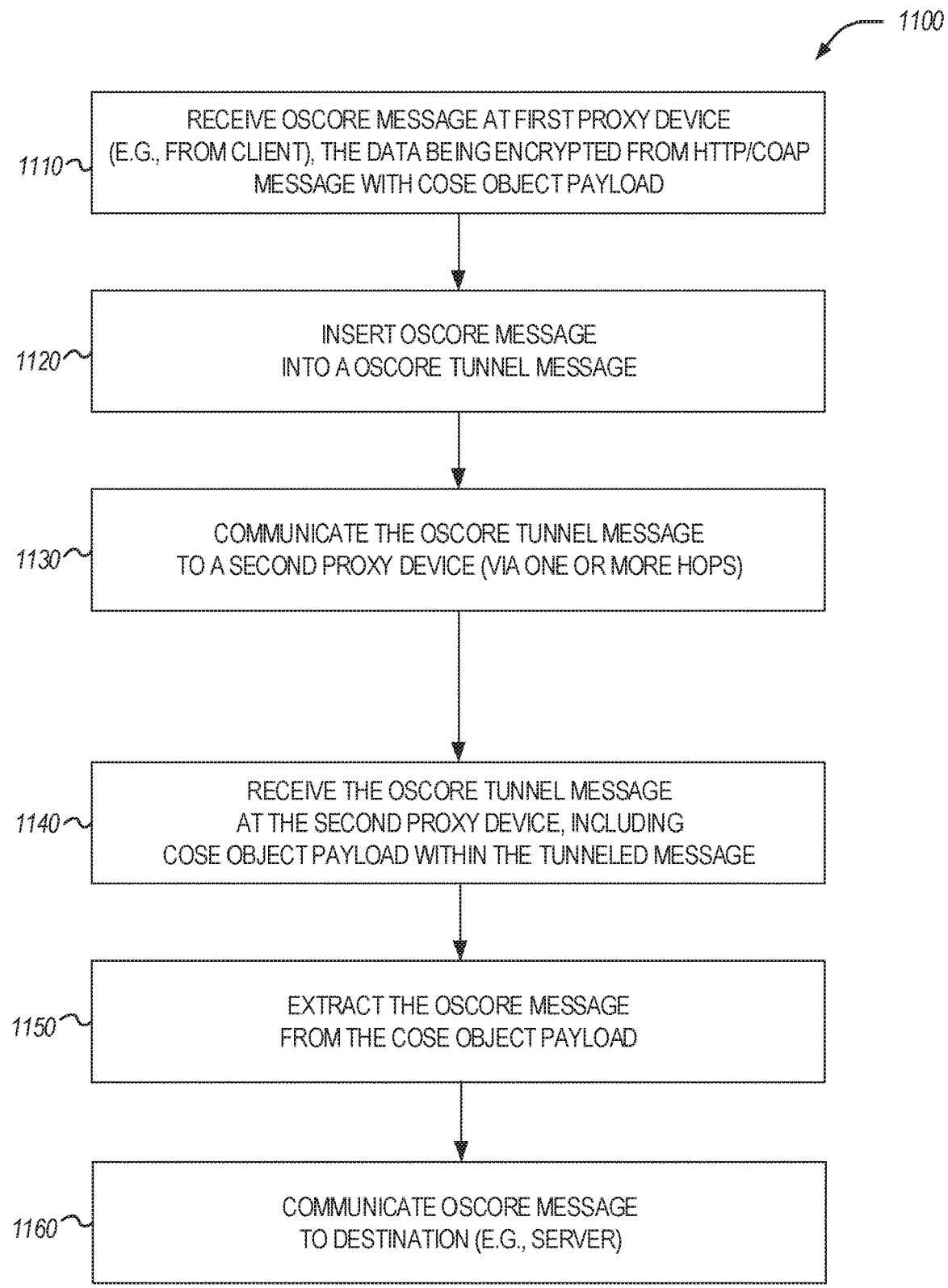
FIG. 11 illustrates a flowchart of a method for establishing and utilizing multi-domain message routing in a network environment, via OSCORE tunneling, according to an example.

FIG. 11 illustrates a flowchart 1100 of an example method for establishing and utilizing multi-domain message routing in a network environment, via OSCORE tunneling. In an example, the operations of flowchart 1100 are performed by a first proxy device (operations 1110-1130) and a second proxy device (operations 1140-1160). However, additional devices, or a coordinated system, may perform the operations 1110-1160 or fewer/additional operations.

The flowchart 1100 begins with first proxy device operations at 1110 to receive an OSCORE message at first proxy device (e.g., from client). In an example, this message includes data from an OSCORE HTTP/COAP message which includes a COSE object payload. For instance, the COSE object payload may include a COSE object including E2E headers and an encrypted CBOR object. The operations continue at 1120 to insert the OSCORE message into an OSCORE tunnel message. In an example, the OSCORE tunnel message is used to establish a tunneled communication with a receiving device, wherein the OSCORE tunnel message includes the OSCORE message within an envelope encrypted COSE object payload. The operations then continue at 1130 to communicate the OSCORE tunnel message to a receiving device, such as a second proxy device, via one or more hops. In further examples (indicated below) the envelope encrypted COSE object payload may be decrypted into the OSCORE message upon being received at the receiving device.

In a specific example, the OSCORE tunnel message is transmitted to a destination device using the tunneled communication over a network, where the tunneled communication is provided via one or more intermediate devices, and the one or more intermediate devices involves the receiving device. In this scenario, the device may be the first proxy device, and the receiving device may be the second proxy device.

In further examples, optional operations may include translating the OSCORE message from a first format to a second format, where the first format is one of a HTTP message format or a COAP message format, and the second format is the other of the HTTP message format or the COAP message format. In this scenario, the encrypted COSE object payload is included in the OSCORE message as provided in the HTTP message format and the COAP message format.

In further examples, the OSCORE message is an OSCORE HTTP message that comprises an HTTP request, hop-by-hop headers, and the encrypted COSE object payload. In further examples, the OSCORE message is an OSCORE COAP message that comprises a COAP header, hop-by-hop options, and the encrypted COSE object payload. Additionally, the OSCORE message may be a RESTful communication message provided between: a source device operating as one of a client or a server, and a destination device operating as the other of the client or the server.

The flowchart 1100 concludes with operations at a receiving device (e.g., a second proxy device), including operations at 1140 to receive the OSCORE tunnel message, which includes the COSE object payload within the tunneled message; to extract the OSCORE message from the COSE object payload at 1150; and to communicate the OSCORE message to a destination (such as a server) at 1160. Further operations for translating the OSCORE message, decrypting the encrypted COSE object payload into a decrypted version of the OSCORE message, or coordinating communications with the destination, may also be performed by the receiving device or other coordinated actors.

In other examples, the operations and functionality described above with reference to FIGS. 3-11 may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a machine in the form of a computer, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 12:
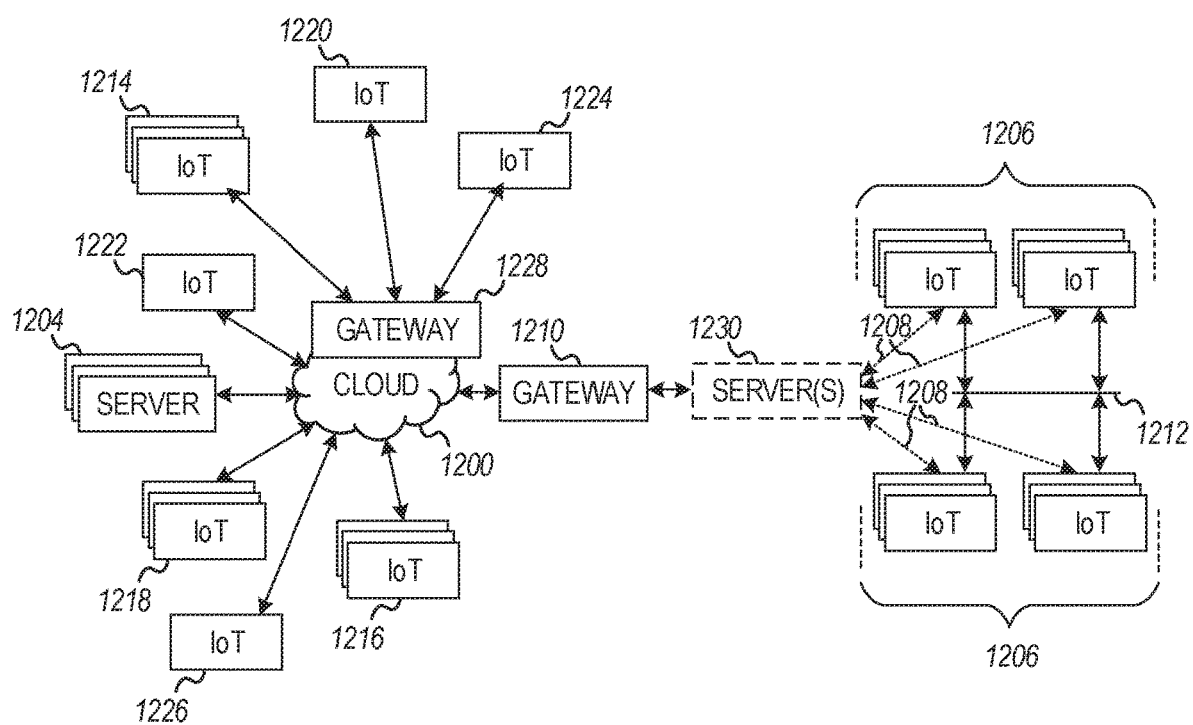
FIG. 12 illustrates a block diagram of a network illustrating communications among a number of IoT devices, according to an example.

FIG. 12 illustrates a drawing of a cloud computing network, or cloud 1200, in communication with a number of Internet of Things (IoT) devices. The cloud 1200 may represent the Internet or may be a local area network (LAN), or a wide area network (WAN), such as a proprietary network for a company. The IoT devices may include any number of different types of devices, grouped in various combinations. For example, a traffic control group 1206 may include IoT devices along streets in a city. These IoT devices may include stoplights, traffic flow monitors, cameras, weather sensors, and the like. The traffic control group 1206, or other subgroups, may be in communication with the cloud 1200 through wired or wireless links 1208, such as LPWA links, optical links, and the like. Further, a wired or wireless sub-network 1212 may allow the IoT devices to communicate with each other, such as through a local area network, a wireless local area network, and the like. The IoT devices may use another device, such as a gateway 1210 or 1228 to communicate with remote locations such as the cloud 1200; the IoT devices may also use one or more servers 1230 to facilitate communication with the cloud 1200 or with the gateway 1210. For example, the one or more servers 1230 may operate as an intermediate network node to support a local edge cloud or fog implementation among a local area network. Further, the gateway 1228 that is depicted may operate in a cloud-to-gateway-to-many edge devices configuration, such as with the various IoT devices 1214, 1220, 1224 being constrained or dynamic to an assignment and use of resources in the cloud 1200.

Other example groups of IoT devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these IoT devices may be in communication with other IoT devices, with servers 1204, with another IoT fog platform or system (not shown, but depicted in FIG. 2), or a combination therein. The groups of IoT devices may be deployed in various residential, commercial, and industrial settings (including in both private or public environments).

As may be seen from FIG. 12, a large number of IoT devices may be communicating through the cloud 1200. This may allow different IoT devices to request or provide information to other devices autonomously. For example, a group of IoT devices (e.g., the traffic control group 1206) may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection in sufficient time for the emergency vehicle 1224 to have unimpeded access to the intersection.

Clusters of IoT devices, such as the remote weather stations 1214 or the traffic control group 1206, may be equipped to communicate with other IoT devices as well as with the cloud 1200. This may allow the IoT devices to form an ad-hoc network between the devices, allowing them to function as a single device, which may be termed a fog platform or system (e.g., as described above with reference to FIG. 2).

Figure 13:
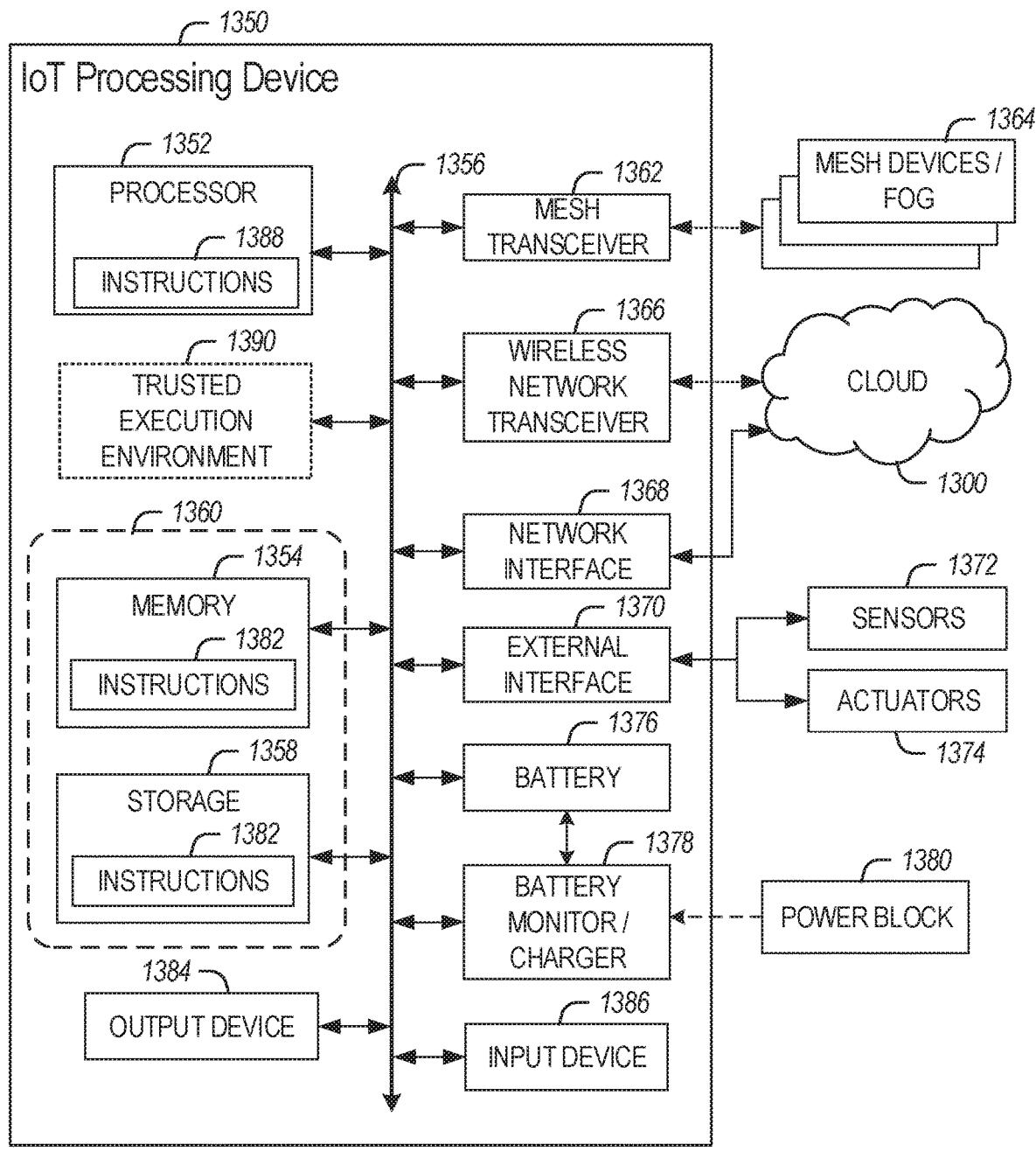
FIG. 13 illustrates a block diagram for an example IoT processing system architecture upon which any one or more of the techniques (e.g., operations, processes, methods, and methodologies) discussed herein may be performed.

FIG. 13 is a block diagram of an example of components that may be present in an IoT device 1350 for implementing the techniques described herein. The IoT device 1350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1350, or as components otherwise incorporated within a chassis of a larger system. Additionally, the block diagram of FIG. 13 is intended to depict a high-level view of components of the IoT device 1350. However, some of the components shown may be omitted, additional components may be present, and different arrangement of the components shown may occur in other implementations.

The IoT device 1350 may include processing circuitry in the form of a processor 1352, which may be a microprocessor, a multi-core processor, a multithreaded processor, an ultra-low voltage processor, an embedded processor, or other known processing elements. The processor 1352 may be a part of a system on a chip (SoC) in which the processor 1352 and other components are formed into a single integrated circuit, or a single package, such as the Edison™ or Galileo™ SoC boards from Intel. As an example, the processor 1352 may include an Intel® Architecture Core™ based processor, such as a Quark™, an Atom™, an i3, an i5, an i7, or an MCU-class processor, or another such processor available from Intel® Corporation. Santa Clara. Calif. However, any number other processors may be used, such as available from Advanced Micro Devices. Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1352 may communicate with a system memory 1354 over an interconnect 1356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR. LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1358 may also couple to the processor 1352 via the interconnect 1356. In an example the storage 1358 may be implemented via a solid state disk drive (SSDD). Other devices that may be used for the storage 1358 include flash memory cards, such as SD cards, microSD cards, xD picture cards, and the like, and USB flash drives. In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components may communicate over the interconnect 1356. The interconnect 1356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1356 may be a proprietary bus, for example, used in a SoC based system. Other bus systems may be included, such as an 12C interface, an SPI interface, point to point interfaces, and a power bus, among others.

The interconnect 1356 may couple the processor 1352 to a mesh transceiver 1362, for communications with other mesh devices 1364. The mesh transceiver 1362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group. or the ZigBee® standard, among others. Any number of radios, configured for a particular wireless communication protocol, may be used for the connections to the mesh devices 1364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1362 may communicate using multiple standards or radios for communications at different range. For example, the IoT device 1350 may communicate with close devices. e.g., within about 10 meters, using a local transceiver based on BLE, or another low power radio, to save power. More distant mesh devices 1364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1366 may be included to communicate with devices or services in the cloud 1300 via local or wide area network protocols. The wireless network transceiver 1366 may be a LPWA transceiver that follows the IEEE 802.15.4, or IEEE 802.15.4g standards, among others. The IoT device 1350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox. and other technologies. Further, other communications techniques, such as time-slotted channel hopping, described in the IEEE 802.15.4e specification may be used.

Any number of other radio communications and protocols may be used in addition to the systems mentioned for the mesh transceiver 1362 and wireless network transceiver 1366, as described herein. For example, the radio transceivers 1362 and 1366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1362 and 1366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1368 may be included to provide a wired communication to the cloud 1300 or to other devices, such as the mesh devices 1364. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1368 may be included to enable connect to a second network, for example, a NIC 1368 providing communications to the cloud over Ethernet, and a second NIC 1368 providing communications to other devices over another type of network.

Given the variety of types of applicable communications from the device to another component or network, applicable communications circuitry used by the device may include or be embodied by any one or more of components 1262, 1266, 1268, or 1270. Accordingly, in various examples, applicable means for communicating (e.g., receiving, transmitting, etc.) may be embodied by such communications circuitry.

The interconnect 1356 may couple the processor 1352 to an external interface 1370 that is used to connect external devices or subsystems. The external devices may include sensors 1372, such as accelerometers, level sensors, flow sensors, optical light sensors, camera sensors, temperature sensors, a global positioning system (GPS) sensors, pressure sensors, barometric pressure sensors, and the like. The external interface 1370 further may be used to connect the IoT device 1350 to actuators 1374, such as power switches, valve actuators, an audible sound generator, a visual warning device, and the like.

In some optional examples, various input/output (I/O) devices may be present within, or connected to, the IoT device 1350. For example, a display or other output device 1384 may be included to show information, such as sensor readings or actuator position. An input device 1386, such as a touch screen or keypad may be included to accept input. An output device 1384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1350.

A battery 1376 may power the IoT device 1350, although in examples in which the IoT device 1350 is mounted in a fixed location, it may have a power supply coupled to an electrical grid. The battery 1376 may be a lithium ion battery, or a metal-air battery, such as a zinc-air battery, an aluminum-air battery, a lithium-air battery, and the like.

A battery monitor/charger 1378 may be included in the IoT device 1350 to track the state of charge (SoCh) of the battery 1376. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1378 may communicate the information on the battery 1376 to the processor 1352 over the interconnect 1356. The battery monitor/charger 1378 may also include an analog-to-digital (ADC) convertor that enables the processor 1352 to directly monitor the voltage of the battery 1376 or the current flow from the battery 1376. The battery parameters may be used to determine actions that the IoT device 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the IoT device 1350. A wireless battery charging circuit, such as an LTC4020 chip from Linear Technologies of Milpitas. Calif., among others, may be included in the battery monitor/charger 1378. The specific charging circuits chosen depend on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application specific integrated circuit (ASIC).

In an example, the instructions 1382 provided via the memory 1354, the storage 1358, or the processor 1352 may be embodied as a non-transitory, machine readable medium 1360 including code to direct the processor 1352 to perform electronic operations in the IoT device 1350. The processor 1352 may access the non-transitory, machine readable medium 1360 over the interconnect 1356. For instance, the non-transitory, machine readable medium 1360 may be embodied by devices described for the storage 1358 or may include specific storage units such as optical disks, flash drives, or any number of other hardware devices. The non-transitory, machine-readable medium 1360 may include instructions to direct the processor 1352 to perform a specific sequence or flow of actions, for example, as described with respect to the flowchart(s) and block diagram(s) of operations and functionality depicted above.

In still a specific example, the instructions 1288 on the processor 1252 (separately, or in combination with the instructions 1288 of the machine readable medium 1260) may configure execution or operation of a trusted execution environment (TEE) 1290. In an example, the TEE 1290 operates as a protected area accessible to the processor 1252 for secure execution of instructions and secure access to data. Various implementations of the TEE 1290, and an accompanying secure area in the processor 1252 or the memory 1254 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1250 through the TEE 1290 and the processor 1252.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks: and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device, comprising: communications circuitry; processing circuitry; and a memory device including instructions embodied thereon, wherein the instructions, which when executed by the processing circuitry, configure the processing circuitry to perform operations comprising: receiving, via the communications circuitry, an OSCORE (Object Security for Constrained RESTful Environments) message, wherein the OSCORE message includes, an encrypted COSE (Concise Binary Object Representation (CBOR) Object Signing and Encryption) object payload;

inserting the OSCORE message into an OSCORE tunnel message, wherein the OSCORE tunnel message is used to implement a tunneled communication with a receiving device, wherein the OSCORE tunnel message includes the OSCORE message within an envelope encrypted COSE object payload; and transmitting, via the communications circuitry, the OSCORE tunnel message to the receiving device.

In Example 2, the subject matter of Example 1 includes, the OSCORE tunnel message being transmitted to a destination device using the tunneled communication over a network, and wherein the tunneled communication is provided via one or more intermediate devices, the one or more intermediate devices including the receiving device.

In Example 3, the subject matter of Example 2 includes, the device being a first proxy device, wherein the receiving device is a second proxy device.

In Example 4, the subject matter of Examples 1-3 includes: translating the OSCORE message from a first format to a second format, wherein the first format is one of a HyperText Transport Protocol (HTTP) message format or a Constrained Application Protocol (COAP) message format, and the second format is the other of the HTTP message format or the COAP message format; wherein the encrypted COSE object payload is included in the OSCORE message as provided in the one of the HTTP message format or the COAP message format used for the OSCORE message prior to the translating.

In Example 5, the subject matter of Examples 1-4 includes, the encrypted COSE object payload comprising a COSE object including end-to-end headers and a CBOR object, wherein the CBOR object is encrypted.

In Example 6, the subject matter of Examples 1-5 includes, the OSCORE message comprising one of: an OSCORE HyperText Transport Protocol (HTTP) message comprising a HTTP request, hop-by-hop headers, and the encrypted COSE object payload; or an OSCORE Constrained Application Protocol (COAP) message comprising a COAP header, hop-by-hop options, and the encrypted COSE object payload.

In Example 7, the subject matter of Examples 1-6 includes, the envelope encrypted COSE object payload being decrypted into the OSCORE message upon being received at the receiving device.

In Example 8, the subject matter of Examples 1-7 includes, the OSCORE message comprising a RESTful communication message provided between: a source device operating as one of a client or a server, and a destination device operating as the other of the client or the server.

Example 9 is a method for secure communications using OSCORE tunneling, using operations performed by a device comprising: receiving an OSCORE (Object Security for Constrained RESTful Environments) message, wherein the OSCORE message includes, an encrypted COSE (Concise Binary Object Representation (CBOR) Object Signing and Encryption) object payload; inserting the OSCORE message into an OSCORE tunnel message, wherein the OSCORE tunnel message is used to implement a tunneled communication with a receiving device, wherein the OSCORE tunnel message includes the OSCORE message within an envelope encrypted COSE object payload; and transmitting the OSCORE tunnel message to the receiving device.

In Example 10, the subject matter of Example 9 includes, the OSCORE tunnel message being transmitted to a destination device using the tunneled communication over a network, and wherein the tunneled communication is provided via one or more intermediate devices, the one or more intermediate devices including the receiving device.

In Example 11, the subject matter of Example 10 includes, the device being a first proxy device, wherein the receiving device is a second proxy device.

In Example 12, the subject matter of Examples 9-11 includes: translating the OSCORE message from a first format to a second format, wherein the first format is one of a HTTP message format or a Constrained Application Protocol (COAP) message format, and the second format is the other of the HTTP message format or the COAP message format; wherein the encrypted COSE object payload is included in the OSCORE message as provided in the one of the HTTP message format or the COAP message format used for the OSCORE message prior to the translating.

In Example 13, the subject matter of Examples 9-12 includes, the encrypted COSE object payload comprising a COSE object including end-to-end headers and a CBOR object, wherein the CBOR object is encrypted.

In Example 14, the subject matter of Examples 9-13 includes, the OSCORE message comprising one of: an OSCORE HyperText Transport Protocol (HTTP) message comprising a HTTP request, hop-by-hop headers, and the encrypted COSE object payload; or an encrypted OSCORE Constrained Application Protocol (COAP) message comprising a COAP header, hop-by-hop options, and the encrypted COSE object payload.

In Example 15, the subject matter of Examples 9-14 includes, the envelope encrypted COSE object payload being decrypted into the OSCORE message upon being received at the receiving device.

In Example 16, the subject matter of Examples 9-15 includes, the OSCORE message comprising a RESTful communication message provided between: a source device operating as one of a client or a server, and a destination device operating as the other of the client or the server.

Example 17 is a machine-readable storage medium including instructions, wherein the instructions, when executed by a processing circuitry of a device, cause the processing circuitry to perform operations of any of Examples 9 to 16.

Example 18 is a system, comprising: a first proxy device, comprising communications circuitry and processing circuitry, the communications circuitry operable to receive and transmit communications in a network, and the processing circuitry configured to perform operations that: receive, via the communications circuitry, an OSCORE (Object Security for Constrained RESTful Environments) message from a source device, wherein the OSCORE message includes, an encrypted COSE (Concise Binary Object Representation (CBOR) Object Signing and Encryption) object payload; insert the OSCORE message into an OSCORE tunnel message, wherein the OSCORE tunnel message is used to implement a tunneled communication with a receiving device, wherein the OSCORE tunnel message includes the OSCORE message within an envelope encrypted COSE object payload; and transmit, via the communications circuitry, the OSCORE tunnel message; a second proxy device operable as the receiving device, comprising communications circuitry and processing circuitry, the communications circuitry operable to receive and transmit messages in the network, and the processing circuitry configured to perform operations that: receive, via the communications circuitry, the OSCORE tunnel message from the first proxy device; extract the OSCORE message from the OSCORE tunnel message; and transmit, via the communications circuitry, the OSCORE message to a destination device.

In Example 19, the subject matter of Example 18 includes, the source device connected to the first proxy device via the network, wherein the source device operates in a role as a client or a server, and the destination device operates in a role as the other of the client or the server.

In Example 20, the subject matter of Examples 18-19 includes, the destination device connected to the second proxy device via the network, wherein the destination device operates in a role as a client or a server, and the source device operates in a role as the other of the client or the server.

In Example 21, the subject matter of Examples 18-20 includes, an untrusted communication device, the untrusted communication device operable as a hop in the network for communication of the OSCORE tunnel message from the first proxy device to the second proxy device.

Example 22 is an apparatus, comprising: means for receiving an OSCORE (Object Security for Constrained RESTful Environments) message, wherein the OSCORE message includes, an encrypted COSE (Concise Binary Object Representation (CBOR) Object Signing and Encryption) object payload; means for inserting the OSCORE message into an OSCORE tunnel message, wherein the OSCORE tunnel message is used to implement a tunneled communication with a receiving device, wherein the OSCORE tunnel message includes the OSCORE message within an envelope encrypted COSE object payload; and means for transmitting the OSCORE tunnel message to the receiving device.

In Example 23, the subject matter of Example 22 includes, the OSCORE tunnel message being transmitted to a destination device using the tunneled communication over a network, wherein the tunneled communication is provided via one or more intermediate devices, the one or more intermediate devices including the receiving device.

In Example 24, the subject matter of Example 23 includes, the apparatus being a first proxy device, wherein the receiving device is a second proxy device.

In Example 25, the subject matter of Examples 22-24 includes, means for translating the OSCORE message from a first format to a second format, wherein the first format is one of a HTTP message format or a Constrained Application Protocol (COAP) message format, and the second format is the other of the HTTP message format or the COAP message format; wherein the encrypted COSE object payload is included in the OSCORE message as provided in the one of the HTTP message format or the COAP message format used for the OSCORE message prior to the translating.

In Example 26, the subject matter of Examples 22-25 includes, the encrypted COSE object payload comprising a COSE object including end-to-end headers and a CBOR object, wherein the CBOR object is encrypted.

In Example 27, the subject matter of Examples 22-26 includes, the OSCORE message comprising one of: an OSCORE HyperText Transport Protocol (HTTP) message comprising a HTTP request, hop-by-hop headers, and the encrypted COSE object payload; or an OSCORE Constrained Application Protocol (COAP) message comprising a COAP header, hop-by-hop options, and the encrypted COSE object payload.

In Example 28, the subject matter of Examples 22-27 includes, the envelope encrypted COSE object payload being decrypted into the OSCORE message upon being received at the receiving device.

In Example 29, the subject matter of Examples 22-28 includes, the OSCORE message comprising a RESTful communication message provided between: a source device operating as one of a client or a server, and a destination device operating as the other of the client or the server.

Example 30 is a device, comprising: communications circuitry; processing circuitry; and a memory device including instructions embodied thereon, wherein the instructions, which when executed by the processing circuitry, configure the processing circuitry to perform operations comprising: receiving, via the communications circuitry, an OSCORE (Object Security for Constrained RESTful Environments) tunnel message from a proxy device; wherein the OSCORE tunnel message is used to implement a tunneled communication between the proxy device and the device; and wherein the OSCORE tunnel message includes, an OSCORE message within an encrypted COSE (Concise Binary Object Representation (CBOR) Object Signing and Encryption) object payload; extracting the OSCORE message from the OSCORE tunnel message; and transmitting, via the communications circuitry, the OSCORE message to a destination device.

In Example 31, the subject matter of Example 30 includes, the OSCORE tunnel message being transmitted to the device using the tunneled communication over a network, wherein the tunneled communication is provided via one or more intermediate devices.

In Example 32, the subject matter of Examples 30-31 includes: translating the OSCORE message from a first format to a second format, wherein the first format is one of a HTTP message format or a Constrained Application Protocol (COAP) message format, and the second format is the other of the HTTP message format or the COAP message format; wherein the encrypted COSE object payload is included in the OSCORE message as provided in the one of the HTTP message format or the COAP message format used for the OSCORE message prior to the translating.

In Example 33, the subject matter of Examples 30-32 includes, the encrypted COSE object payload comprising a COSE object including end-to-end headers and a CBOR object, wherein the CBOR object is encrypted.

In Example 34, the subject matter of Examples 30-33 includes, the OSCORE message comprising one of: an OSCORE HyperText Transport Protocol (HTTP) message comprising a HTTP request, hop-by-hop headers, and the encrypted COSE object payload; or an OSCORE Constrained Application Protocol (COAP) message comprising a COAP header, hop-by-hop options, and the encrypted COSE object payload.

In Example 35, the subject matter of Examples 30-34 includes: decrypting the encrypted COSE object payload into a decrypted version of the OSCORE message.

In Example 36, the subject matter of Examples 30-35 includes, the OSCORE message comprising a RESTful communication message provided between: a source device operating as one of a client or a server, and a destination device operating as the other of the client or the server.

Example 37 is a method for processing secure communications using OSCORE tunneling, using operations performed by a device comprising: receiving an OSCORE (Object Security for Constrained RESTful Environments) tunnel message from a proxy device; wherein the OSCORE tunnel message is used to implement a tunneled communication between the proxy device and the device; and wherein the OSCORE tunnel message includes, an OSCORE message within an encrypted COSE (Concise Binary Object Representation (CBOR) Object Signing and Encryption) object payload; extracting the OSCORE message from the OSCORE tunnel message; and transmitting the OSCORE message to a destination device.

In Example 38, the subject matter of Example 37 includes, the OSCORE tunnel message being transmitted to the device using the tunneled communication over a network, and wherein the tunneled communication is provided via one or more intermediate devices.

In Example 39, the subject matter of Examples 37-38 includes: translating the OSCORE message from a first format to a second format, wherein the first format is one of a HTTP message format or a Constrained Application Protocol (COAP) message format, and the second format is the other of the HTTP message format or the COAP message format; wherein the encrypted COSE object payload is included in the OSCORE message as provided in the one of the HTTP message format or the COAP message format used for the OSCORE message prior to the translating.

In Example 40, the subject matter of Examples 37-39 includes, the encrypted COSE object payload comprising a COSE object including end-to-end headers and a CBOR object, wherein the CBOR object is encrypted.

In Example 41, the subject matter of Examples 37-40 includes, the OSCORE message comprising one of: an OSCORE HyperText Transport Protocol (HTTP) message comprising a HTTP request, hop-by-hop headers, and the encrypted COSE object payload; or an OSCORE Constrained Application Protocol (COAP) message comprising a COAP header, hop-by-hop options, and the encrypted COSE object payload.

In Example 42, the subject matter of Examples 37-41 includes: decrypting the encrypted COSE object payload into a decrypted version of the OSCORE message.

In Example 43, the subject matter of Examples 37-42 includes, the OSCORE message comprising a RESTful communication message provided between: a source device operating as one of a client or a server, and a destination device operating as the other of the client or the server.

Example 44 is a machine-readable storage medium including instructions, wherein the instructions, when executed by a processing circuitry of a device, cause the processing circuitry to perform operations of any of Examples 37 to 43.

Example 45 is an apparatus, comprising: means for receiving an OSCORE (Object Security for Constrained RESTful Environments) tunnel message from a proxy device; wherein the OSCORE tunnel message is used to implement a tunneled communication between the proxy device and the device; and wherein the OSCORE tunnel message includes, an OSCORE message within an encrypted COSE (Concise Binary Object Representation (CBOR) Object Signing and Encryption) object payload; means for extracting the OSCORE message from the OSCORE tunnel message; and means for transmitting the OSCORE message to a destination device.

In Example 46, the subject matter of Example 45 includes, the OSCORE tunnel message being transmitted to the device using the tunneled communication over a network, and wherein the tunneled communication is provided via one or more intermediate devices.

In Example 47, the subject matter of Examples 45-46 includes, means for translating the OSCORE message from a first format to a second format, wherein the first format is one of a HTTP message format or a Constrained Application Protocol (COAP) message format, and the second format is the other of the HTTP message format or the COAP message format; wherein the encrypted COSE object payload is included in the OSCORE message as provided in the one of the HTTP message format or the COAP message format used for the OSCORE message prior to the translating.

In Example 48, the subject matter of Examples 45-47 includes, the encrypted COSE object payload comprising a COSE object including end-to-end headers and a CBOR object, wherein the CBOR object is encrypted.

In Example 49, the subject matter of Examples 45-48 includes, the OSCORE message comprising one of: an OSCORE HyperText Transport Protocol (HTTP) message comprising a HTTP request, hop-by-hop headers, and the encrypted COSE object payload; or an OSCORE Constrained Application Protocol (COAP) message comprising a COAP header, hop-by-hop options, and the encrypted COSE object payload.

In Example 50, the subject matter of Examples 45-49 includes, means for decrypting the envelope encrypted COSE object payload into a decrypted version of the OSCORE message.

In Example 51, the subject matter of Examples 45-50 includes, the OSCORE message comprising a RESTful communication message provided between: a source device operating as one of a client or a server, and a destination device operating as the other of the client or the server.

Example 52 is an IoT services platform adapted to perform the operations of any of Examples 1 to 51.

Example 53 is an Internet of Things (IoT) network topology, the IoT network topology comprising respective communication links adapted to perform communications for the operations of any of Examples 1 to 51.

Example 54 is a network comprising respective devices and device communication mediums for performing any of the operations of Examples 1 to 51.

Example 55 is an edge cloud computing device implementation comprising processing nodes and computing units adapted for performing any of the operations of Examples 1 to 51.

Example 56 is an edge cloud network platform comprising physical and logical computing resources adapted for performing any of the operations of Examples 1 to 51.

Example 57 is an apparatus comprising means for performing any of the operations of Examples 1 to 51.

Example 58 is a system to perform the operations of any of Examples 1 to 51.

The operations and functionality described above in these examples, and in the specific embodiments described with reference to FIGS. 3 to 11, may apply in a variety of network settings such as IoT networking, edge networking, fog networking, cloud networking, and all hybrids thereof. The operations and functionality of these examples and configurations may occur in a distributed fashion, including in distributed networked settings where one aspect of the functionality is performed by a first IoT edge device or edge network, another aspect of the functionality is performed by a fog network or platform, and yet another aspect of the functionality is performed by a cloud device or system. Further combinations which follow these shared, distributed, or grouping principles, as suggested in the examples and configurations above, may be employed. Accordingly, it will be evident that the functionality described herein may be operable to work within many permutations of the examples and configurations above, and like variations.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A device, comprising:
communications circuitry;
processing circuitry; and
a memory device including instructions embodied thereon, wherein the instructions, which when executed by the processing circuitry, configure the processing circuitry to perform operations comprising:
receiving, via the communications circuitry, an OSCORE (Object Security for Constrained RESTful Environments) message, wherein the OSCORE message includes an encrypted COSE (Concise Binary Object Representation (CBOR) Object Signing and Encryption) object payload;
inserting the OSCORE message into an OSCORE tunnel message, wherein the OSCORE tunnel message is used to implement an end-to-end tunneled communication between the device and a destination device, wherein the OSCORE tunnel message is structured to include the OSCORE message within an envelope encrypted COSE object payload of the OSCORE tunnel message; and
transmitting, via the communications circuitry, the OSCORE tunnel message to the destination device in the tunneled communication, the transmitting to provide the OSCORE message inside the envelope encrypted COSE object payload of the OSCORE tunnel message;
wherein the tunneled communication between the device and the destination device includes communication of the envelope encrypted COSE object payload of the OSCORE tunnel message via at least one intermediate device located between the device and the destination device; and
wherein message routing headers of the OSCORE message are encrypted in the envelope encrypted COSE object payload to prevent identification of the message routing headers at the at least one intermediate device.

2. The device of claim 1, wherein the device is a first proxy device, and wherein the destination device is a second proxy device.

3. The device of claim 1, the operations further comprising:
translating the OSCORE message from a first format to a second format, wherein the first format is one of a HyperText Transport Protocol (HTTP) message format or a Constrained Application Protocol (COAP) message format, and the second format is the other of the HTTP message format or the COAP message format;
wherein the encrypted COSE object payload is included in the OSCORE message as provided in the one of the HTTP message format or the COAP message format used for the OSCORE message prior to the translating.

4. The device of claim 1, wherein the encrypted COSE object payload comprises a COSE object including end-to-end headers and a CBOR object, and wherein the CBOR object is encrypted.

5. The device of claim 1, wherein the OSCORE message comprises one of:
an OSCORE HyperText Transport Protocol (HTTP) message comprising a HTTP request, hop-by-hop headers, and the encrypted COSE object payload; or
an OSCORE Constrained Application Protocol (COAP) message comprising a COAP header, hop-by-hop options, and the encrypted COSE object payload.

6. The device of claim 1, wherein the envelope encrypted COSE object payload is decrypted into the OSCORE message upon being received at the destination device.

7. The device of claim 1, wherein the OSCORE message comprises a RESTful communication message provided between: the device operating as one of a client or a server, and the destination device operating as the other of the client or the server.

8. A method for secure communications using OSCORE tunneling, using operations performed by a device comprising:
receiving an OSCORE (Object Security for Constrained RESTful Environments) message, wherein the OSCORE message includes an encrypted COSE (Concise Binary Object Representation (CBOR) Object Signing and Encryption) object payload;
inserting the OSCORE message into an OSCORE tunnel message, wherein the OSCORE tunnel message is used to implement a tunneled communication between the device and a destination device, wherein the OSCORE tunnel message is structured to include the OSCORE message within an envelope encrypted COSE object payload of the OSCORE tunnel message; and
transmitting the OSCORE tunnel message to the destination device in the tunneled communication, the transmitting to provide the OSCORE message inside the envelope encrypted COSE object payload of the OSCORE tunnel message;
wherein the tunneled communication between the device and the destination device includes communication of the envelope encrypted COSE object payload of the OSCORE tunnel message via at least one intermediate device located between the device and the destination device; and
wherein message routing headers of the OSCORE message are encrypted in the envelope encrypted COSE object payload to prevent identification of the message routing headers at the at least one intermediate device.

9. The method of claim 8, wherein the device is a first proxy device, and wherein the destination device is a second proxy device.

10. The method of claim 8, the operations further comprising:
translating the OSCORE message from a first format to a second format, wherein the first format is one of a HTTP message format or a Constrained Application Protocol (COAP) message format, and the second format is the other of the HTTP message format or the COAP message format;
wherein the encrypted COSE object payload is included in the OSCORE message as provided in the one of the HTTP message format or the COAP message format used for the OSCORE message prior to the translating.

11. The method of claim 8, wherein the encrypted COSE object payload comprises a COSE object including end-to-end headers and a CBOR object, wherein the CBOR object is encrypted.

12. The method of claim 8, wherein the OSCORE message comprises one of:
an OSCORE HyperText Transport Protocol (HTTP) message comprising a HTTP request, hop-by-hop headers, and the encrypted COSE object payload; or
an encrypted OSCORE Constrained Application Protocol (COAP) message comprising a COAP header, hop-by-hop options, and the encrypted COSE object payload.

13. The method of claim 8, wherein the envelope encrypted COSE object payload is decrypted into the OSCORE message upon being received at the destination device.

14. The method of claim 8, wherein the OSCORE message comprises a RESTful communication message provided between: the device operating as one of a client or a server, and the destination device operating as the other of the client or the server.

15. A non-transitory machine-readable storage medium including instructions, wherein the instructions, when executed by a processing circuitry of a device, cause the processing circuitry to perform operations comprising:
  receiving an OSCORE (Object Security for Constrained RESTful Environments) message, wherein the OSCORE message includes an encrypted COSE (Concise Binary Object Representation (CBOR) Object Signing and Encryption) object payload;
  inserting the OSCORE message into an OSCORE tunnel message, wherein the OSCORE tunnel message is used to implement a tunneled communication between the device and a destination device, wherein the OSCORE tunnel message is structured to include the OSCORE message within an envelope encrypted COSE object payload of the OSCORE tunnel message; and
  transmitting the OSCORE tunnel message to the destination device in the tunneled communication, the transmitting to provide the OSCORE message inside the envelope encrypted COSE object payload of the OSCORE tunnel message;
  wherein the tunneled communication between the device and the destination device includes communication of the envelope encrypted COSE object payload of the OSCORE tunnel message via at least one intermediate device located between the device and the destination device; and
  wherein message routing headers of the OSCORE message are encrypted in the envelope encrypted COSE object payload to prevent identification of the message routing headers at the at least one intermediate device.

16. The machine-readable storage medium of claim 15, wherein the device is a first proxy device, and wherein the destination device is a second proxy device.

17. The machine-readable storage medium of claim 15, the operations further comprising:
  translating the OSCORE message from a first format to a second format, wherein the first format is one of a HTTP message format or a Constrained Application Protocol (COAP) message format, and the second format is the other of the HTTP message format or the COAP message format;
  wherein the encrypted COSE object payload is included in the OSCORE message as provided in the one of the HTTP message format or the COAP message format used for the OSCORE message prior to the translating.

18. The machine-readable storage medium of claim 15, wherein the encrypted COSE object payload comprises a COSE object including end-to-end headers and a CBOR object, wherein the CBOR object is encrypted.

19. The machine-readable storage medium of claim 15, wherein the OSCORE message comprises one of:
  an OSCORE HyperText Transport Protocol (HTTP) message comprising a HTTP request, hop-by-hop headers, and the encrypted COSE object payload; or
  an encrypted OSCORE Constrained Application Protocol (COAP) message comprising a COAP header, hop-by-hop options, and the encrypted COSE object payload.

20. The machine-readable storage medium of claim 15, wherein the envelope encrypted COSE object payload is decrypted into the OSCORE message upon being received at the destination device.

21. The machine-readable storage medium of claim 15, wherein the OSCORE message comprises a RESTful communication message provided between: the device operating as one of a client or a server, and the destination device operating as the other of the client or the server.

* * * * *